(12) United States Patent
Shimizu et al.

(10) Patent No.: US 7,245,481 B2
(45) Date of Patent: Jul. 17, 2007

(54) DISPLAY APPARATUS

(75) Inventors: Yosuke Shimizu, Tokyo (JP); Haruo Oba, Kanagawa (JP)

(73) Assignee: Sony Corporation, Tokyo (JP)

( * ) Notice: Subject to any disclaimer, the term of this patent is extended or adjusted under 35 U.S.C. 154(b) by 51 days.

(21) Appl. No.: 10/507,794

(22) PCT Filed: Dec. 25, 2003

(86) PCT No.: PCT/JP03/16788

§ 371 (c)(1),
(2), (4) Date: Sep. 13, 2004

(87) PCT Pub. No.: WO2004/064016

PCT Pub. Date: Jul. 29, 2004

(65) Prior Publication Data

US 2005/0105257 A1    May 19, 2005

(30) Foreign Application Priority Data

Jan. 14, 2003    (JP) ............................. 2003-006030

(51) Int. Cl.
*G06F 1/16* (2006.01)
(52) U.S. Cl. .................. 361/681; 248/371; 248/284.1; 248/917; 345/156; 345/901
(58) Field of Classification Search ................ 361/681, 361/682; 312/7.2
See application file for complete search history.

(56) References Cited

U.S. PATENT DOCUMENTS 5,668,570 A * 9/1997 Ditzik ......................... 345/173
6,031,714 A * 2/2000 Ma ............................. 361/681
6,081,420 A * 6/2000 Kim et al. ................... 361/681
6,288,891 B1 * 9/2001 Hasegawa et al. .......... 361/681
6,378,830 B1 * 4/2002 Lu ............................ 248/278.1
6,392,873 B1   5/2002 Honda (Continued)

FOREIGN PATENT DOCUMENTS

| JP | 1-273086 | 10/1989 |
| JP | 01273086 A * | 10/1989 |
| JP | 2001-78122 | 3/2001 |
| JP | 2001078122 A * | 3/2001 |

OTHER PUBLICATIONS

"Definition of fixed—Merriam-Webster Online Dicitionary" http://www.m-w.com/cgi-bin/dictionary Aug. 10, 2006.*

*Primary Examiner*—Lisa Lea-Edmonds
(74) *Attorney, Agent, or Firm*—Frommer Lawrence & Haug LLP; William S. Frommer; Thomas F. Presson (57) ABSTRACT

A low-cost display apparatus whose display section can have its angle and height adjusted easily through a stand of a simple structure is provided. The stand of the display apparatus includes first and second arms that form a V shape. The first arm is attached to the display section through a hinge. By having the second arm extend to the front and the back underneath the display section so that the second arm is laid on a surface, the display section is supported in a first supported state at a distance from this surface. By having the second arm extend downward diagonally from the tip of the first arm so that the tip of the second arm and the lower end of the display section stand on a surface, the display section is supported in a second supported state where the display section is in contact with this surface.

14 Claims, 5 Drawing Sheets

U.S. PATENT DOCUMENTS

| | | | |
|---|---|---|---|
| 6,430,038 B1 * | 8/2002 | Helot et al. | 361/681 |
| 6,480,373 B1 * | 11/2002 | Landry et al. | 361/680 |
| 6,532,152 B1 * | 3/2003 | White et al. | 361/692 |
| 6,543,734 B2 * | 4/2003 | Yeh | 248/291.1 |
| 6,704,193 B2 * | 3/2004 | Vathulya | 361/681 |
| 6,741,458 B2 * | 5/2004 | Wu | 361/681 |
| 6,954,221 B2 * | 10/2005 | Wu | 361/681 |
| 7,148,874 B2 * | 12/2006 | Anzai et al. | 345/156 |

* cited by examiner

FIG.6A FIG.6B FIG.6C

DISPLAY APPARATUS

TECHNICAL FIELD

The present invention relates to a display apparatus having a display section formed in the shape of a thin flat panel and a stand section that supports this display section. Particularly, the present invention relates to a display apparatus of which the height and angle of its display section can be altered as desired.

BACKGROUND ART

As display apparatuses that are used, for example, as peripherals for personal computers, there have been apparatuses of such a structure in which a flat panel-shaped display section comprised of, for example, a liquid crystal panel is supported by a stand section.

Recently, there has been proposed an apparatus in which, by adopting a fold structure for the stand section, the display section is supported not only at a first supported state in which the display section is not in contact with the surface of the desk it is placed upon, but also at a second supported state in which the display section is lowered to be on the desktop, thus improving convenience for users (see, for example, Japanese Patent Application Publication No. 2002-73214, FIGS. 24 and 25).

DISCLOSURE OF THE INVENTION

However, in the example above, the stand section is comprised of a support arm of a multi-joint structure, and there are provided a hinge section between the back side of the display section and the upper end section of the support arm, as well as two other hinge sections midway of the support arm and at its base end section, thereby leading to such problems as increased complexity and higher costs.

As such, the present invention attempts to provide a low-cost display apparatus of a simply structure in which the first supported state and the second supported state mentioned above can be achieved for the display section.

A display apparatus related to an embodiment of the present invention may include: a thin flat panel-shaped display section; and a stand section for supporting the above-mentioned display section on a surface upon which the display apparatus is placed. The stand section has a first arm section and a second arm section, which are connected so as to form a V-shape. The tip of the first arm is attached to the back side of the display section through a hinge section so as to be rotatable in the forward and backward directions. The stand section is so arranged that a first supported state and a second supported state for the display section can be achieved. In the first supported state, by having the first arm section extend downward diagonally from the above-mentioned hinge section, and the second arm section extend to the front and the back underneath the display section so that the second arm section is laid on the surface on which the display apparatus is placed, the display section is supported at a distance from the surface on which the display apparatus is placed. In the second supported state, by having the first arm section extend upward diagonally from the above-mentioned hinge section, and the second arm section extend downward diagonally from the end section of the first arm section so that the tip section of the second arm section and the lower end section of the display section stand on the surface on which the display apparatus is placed, the display section is supported in a state where the display section is in contact with the surface on which the display apparatus is placed.

In the display apparatus described above, the stand section is comprised of the first arm section and the second arm section that are linked in a state where the stand section is bent in the shape of a V, and only the first arm section and the display section are attached through the hinge section.

By having the second arm section extend to the front and the back underneath the display section, the first supported state is achieved where the second arm section is laid on the surface on which the display apparatus is placed, and the display section is at a distance from that surface.

In addition, by having the first arm section extend upward diagonally from the hinge section, the second supported state is achieved where the tip section of the second arm section and the lower end section of the display section stand on the surface on which the display apparatus is placed, and the display section is in contact with that surface.

Thus, in the display apparatus described above, by virtue of a simple structure in which the hinge section is provided only between the display section and the stand section, a display apparatus having a low-cost support structure can be provided.

BEST MODES FOR CARRYING OUT THE INVENTION

An embodiment of a display apparatus related to the present invention will be described below.

FIGS. 1A and 1B, and FIGS. 2A through 2C show the external appearance of an example of a display apparatus related to the present invention.

In addition, FIGS. 3A through 3C, 4A through 4C, 5A and 5B, and 6A through 6C show various states in which a display section of the display apparatus shown in FIGS. 1A and 1B and 2A through 2C may be supported.

As shown in the drawings, the display apparatus in this example includes a display section 100 of a thin flat panel shape, and a stand section 200, which supports this display section on a surface on which the display apparatus is placed. In this example, a case where a keyboard apparatus 300 separate from the display apparatus is used will be described.

First, a description will be given with respect to the display section 100.

The display section 100 in the present example is one that uses, for example, a liquid crystal display panel, an organic EL panel or the like, and has a display screen 120 having a predetermined aspect ratio provided on the front surface of a rectangular flat panel-shaped case 110. On the front surface of the case 110 to the upper right of the display screen 120 is provided an LED indicator 112 for indicating whether the power is on or off.

On one side of the case 110 are provided a power key 114 for turning the power of the display section 100 on and off, a menu key 116 for displaying a menu such as luminance adjustment for the display screen 120 and the like, and an operation key 118 for performing a selective operation with respect to the displayed menu.

On both sides of the bottom surface of the case 110 is provided a pair of protruding pieces 122 and 124 made of a rubber material as a friction material having a high friction coefficient. These protrusion pieces 122 and 124 may be attached to the lower edge section of the case 110 through adhesion and the like, and serve as contact sections that contact the surface of, for example, a desk on which the display apparatus is placed when said display apparatus is placed in a second supported state, which will be described further below.

Towards the lower side of the back surface of the case 110 is provided a hinge section 400 for connecting with a first arm section 210 of the stand section 200, which will be described later, in such a manner as to be freely rotatable in the forward and backward directions.

The hinge section 400 includes a horizontal support shaft 410 (see FIG. 1A) that joins the case 110 and the first arm section 210 in a freely rotatable manner, and a friction mechanism (not shown) is incorporated in close proximity to the support shaft 410. When the display section 100 is rotated by a desired angle with respect to the stand section 200, a certain frictional force is applied in response to that rotating motion. In the friction mechanism of the present example, a structure in which one of two levels of frictional force is applied depending on the angle range of the display section 100 is adopted. When the display section 100 is at an angle within a predetermined range, which is assumed to be the range under usual circumstances (such as a predetermined angle range corresponding to the first supported state shown in FIGS. 5A and 5B, and a predetermined angle range corresponding to the second supported state shown in FIGS. 6A through 6C), a relatively small frictional force against which it is relatively easy to maneuver the display section 100 is applied. Conversely, when the display section 100 is at an angle outside of this predetermined angle range (such as an angle range in which the display apparatus is switched between the first supported state and the second supported state as shown in FIG. 4B), a larger frictional force is applied. As an alternate example of the friction mechanism, instead of applying several different levels of frictional force, a frictional force that varies gradually may be applied. Alternatively, it is also possible to apply a greater frictional force when the display section 100 passes a predetermined angle, thereby giving the user a clicking feeling. For these friction mechanisms, various known devices and methods may be used.

In addition, on the back side of the case 110 above the hinge section 400 is provided a housing recess section 126 for housing part of the first arm section 210 of the stand section 200 in the second supported state, which will be described later. This housing recess section 126 has a rectangular shape corresponding to the shape of the first arm section 210 of the stand section 200, and by folding the first arm section 210 of the stand section 200 towards the case 110 with the hinge section 400 as the fulcrum, the housing recess section 126 houses the first arm section 210 so that it is almost in full contact with the housing recess section 126.

A connector housing section 130 is formed on the back side of the case 110, and a cover 132 is placed thereon.

Further, a plurality of heat releasing holes 134 is formed in the upper and lower areas of the back side of the case 110.

Next, the stand section 200 will be described.

The stand section 200 in the present example is comprised of the first arm section 210 that is attached to the back side of the display section 100 through the hinge section 400, and a second arm section 220 that is linked to the first arm section 210 in a bent state so as to form a V-shape with the first arm section 210. In the present example, the first arm section 210 and the second arm section 220 form therebetween an angle of approximately 50°.

Figure 5A:
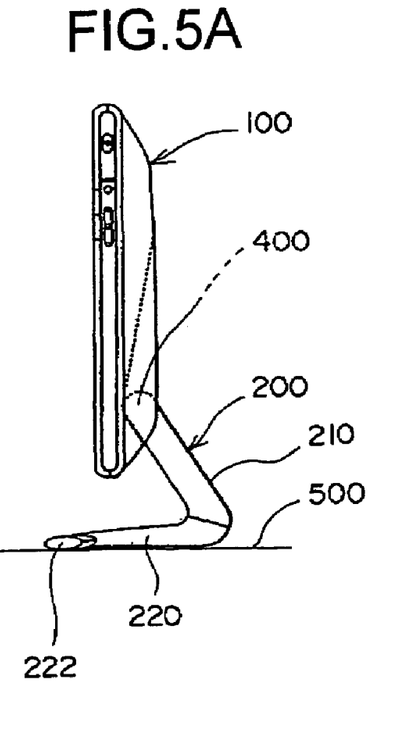
FIGS. 5A and 5B illustrate a first supported state.
Figure 5B:
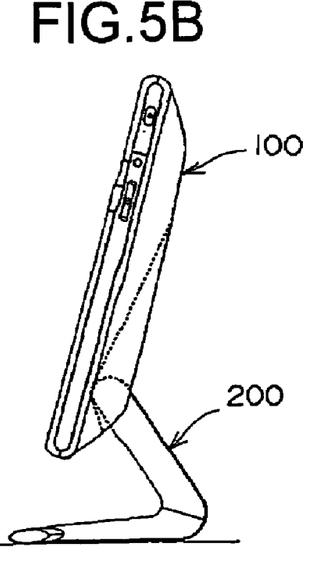
Figures 6A, 6B, 6C:
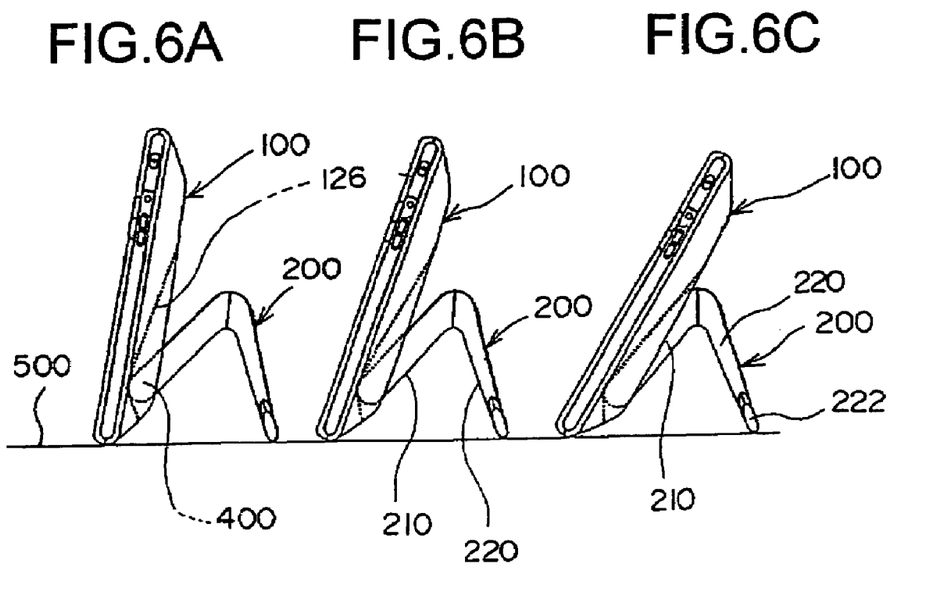
FIGS. 6A through 6C illustrate a second supported state.

This stand section 200 is given a structure that makes it capable of achieving a first supported state and a second supported state. As shown in FIGS. 5A and 5B, in the first supported state, by having the first arm section 210 extend downward diagonally from the hinge section 400, and the second arm section 220 extend to the front and the back underneath the display section 100 so that the second arm section 220 is laid on the surface of a desk or the like on which the display apparatus is placed, the display section 100 is supported at a distance from that surface. As shown in FIGS. 6A through 6C, in the second supported state, by having the first arm section 210 extend upward diagonally from the hinge section 400, and the second arm section 220 extend downward diagonally from the tip section of the first arm section 210 so that the tip section of the second arm section 220 and the lower end section of the display section 100 stand on the surface on which the display apparatus is placed, the display section 100 is supported while in contact with that surface.

Below, various parts of the stand section 200 of the present example will be described.

As should be apparent, the upward and downward directions, as well as the forward and backward directions with respect to the first arm section 210 and the second arm section 220 in the first supported state become reversed in the second supported state. However, in the description to follow, the upward and downward directions and the forward and backward directions with respect to the state shown in FIGS. 1A and 1B and FIGS. 2A through 2C will be taken as a reference.

The first arm section 210 is formed in the shape of a rectangular plate where it has a large width in relation to its thickness, and a length greater than its width. In the present example, the first arm section 210 has ¼ the width of the display section 100.

The upper end section of the first arm section 210 is linked to the back side of the display section 100 through the hinge section 400 so as to be rotatable in the forward and backward directions in relation to the display section 100.

The upper end section of the first arm section 210 is given an arched shape with the hinge section 400 at the center so that a smooth rotating movement can be ensured. In addition, the lower end section of the first arm section 210 is given, as an abutting surface for being joined with the second arm section 220, a flat-shaped surface having a predetermined angle of slant.

The second arm section 220 has the shape of a flat plate that may have, on the whole, a thickness, width and length comparable to those of the first arm section 210. On the tip section of the second arm section 220 is provided a wide flange section 222 that extends in a direction that is orthogonal to the direction in which the first arm section 210 extends. In the present example, the flange section 222 has approximately half the width of the display section 100.

Figure 1A:
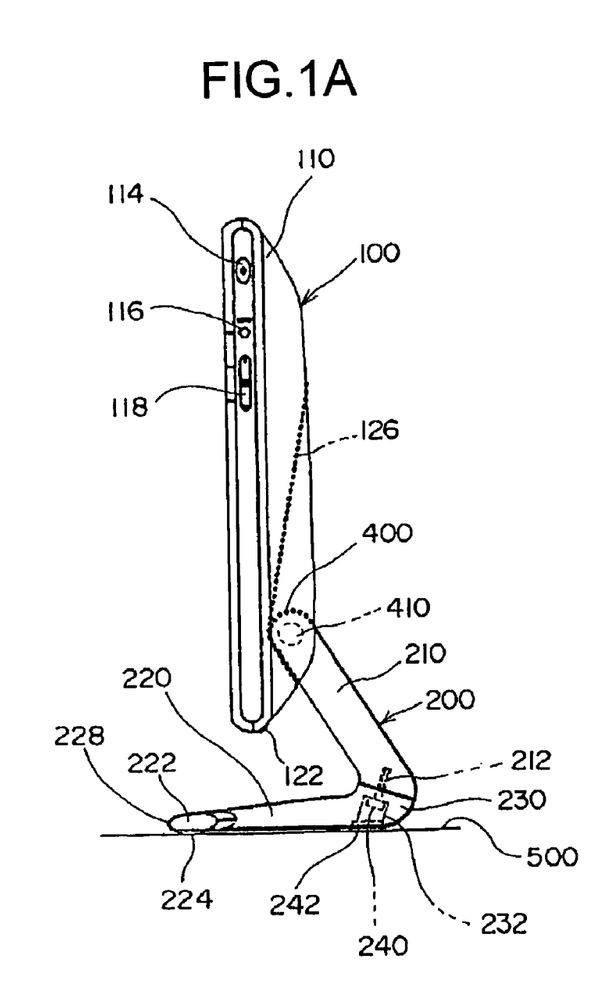
FIG. 1A and FIG. 1B are a side view and a rear view, respectively, showing the external appearance of a display apparatus.

As shown in FIG. 1A, on the back end section of the second arm section 220 is provided a joint section 230 for being joined with the lower end section of the first arm section 210.

The joint section 230 is given a flat-shaped surface that can be placed in close contact with the lower end portion of the first arm section 210, and a pair of insertion holes 232 for allowing a pair of screws 240 through from a reverse side section (a section positioned on the side opposite the side that faces the first arm section 210) is formed. In addition, in the lower end section of the first arm section 210 is formed a pair of screw holes into which the screws 240 can be screwed.

The first arm section 210 and the second arm section 220 are joined with the pair of screws 240 while the joint section 230 of the second arm section 220 and the lower end section of the first arm section 210 are placed in close contact with each other.

Thus, by adopting a structure in which the first arm section 210 and the second arm section 220 are joined with the screws 240, the first arm section 210 and the second arm section 220 can be dissembled by unscrewing the screws 240.

Therefore, in packaging, the display apparatus can be made more compact with the first arm section 210 folded into the housing recess section 126 of the display section 100 without having to separate the first arm section 210 from the display section 100 (that is, to dissemble the hinge section 400). Further, the display apparatus can be made even more compact by positioning the flat plate-shaped second arm section 220 so as to be parallel to the display section 100 and the first arm section 210. In addition, the display apparatus is extremely easy to handle since it can be assembled and dissembled merely with the two screws 240.

On the back side of the second arm section 220, a pair of caps 242 and 244, made of a rubber material as a friction material having a large friction coefficient, is placed over the insertion holes 232 for allowing the screws 240 through. These caps 242 and 244 are given a rectangular flat plate shape corresponding to the shape of the insertion holes 232. One of the shorter end sections is adhered to the inner edge of the insertion hole 232, and by rotating the caps 242 and 244 around the adhered section, the insertion holes 232 are opened and closed.

The screwing positions of the second arm section 220 are placed towards both sides of the arm section 220, and thus the caps 242 and 244 are positioned with an adequate interval in between.

These caps 242 and 244 serve, in the first supported position, as contact sections that contact the surface of a desk, for example, on which the display apparatus is placed.

In addition, towards both ends of the back (bottom) side of the flange section 222 of the second arm section 220 is formed a pair of protruding sections 224 and 226.

These protruding sections 224 and 226, in the first supported state, serve as contact sections that contact the surface of a desk, for example, on which the display apparatus is placed.

Figure 1B:
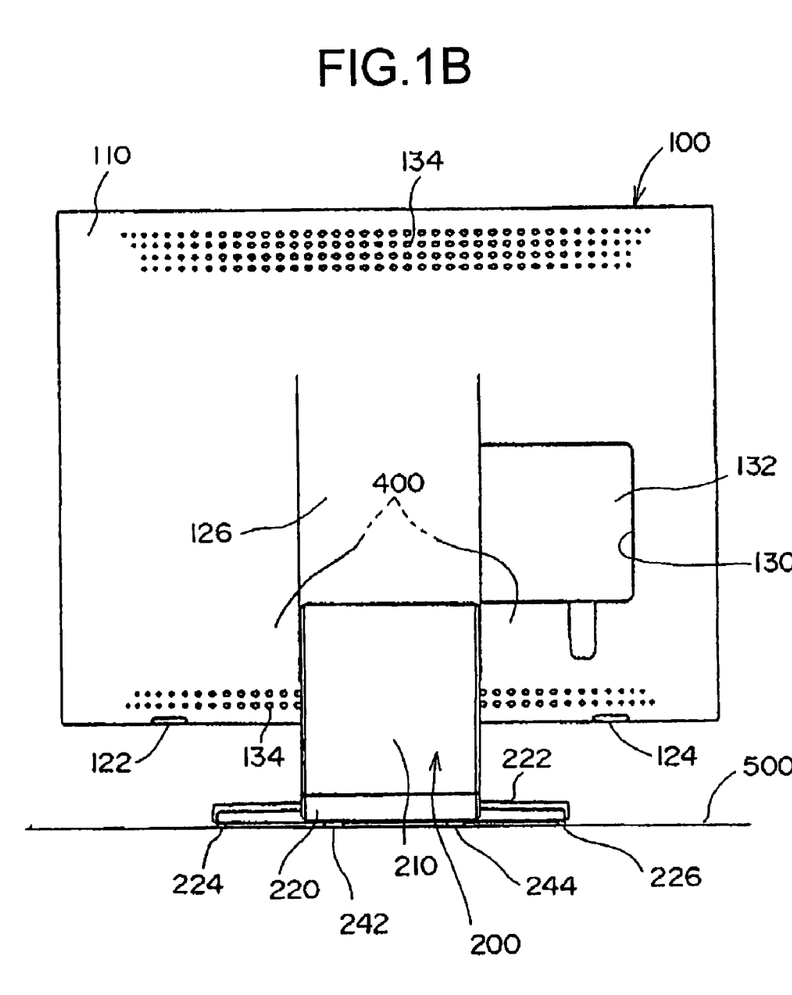

In other words, in the first supported state, as shown in FIGS. 1A and 1B, the back side of the second arm section 220 is laid on a surface on which the display apparatus is placed through point contact at the four points including the above-mentioned pair of caps 242 and 244 and the pair of protruding sections 224 and 226, and the display section 100 is supported at a distance from that surface.

By thus adopting a structure in which the second arm section 220 is laid on a surface through point contact, the back side of second arm section 220 is prevented from becoming dirty, and therefore, although the back side of the second arm section 220 becomes visible in the second supported state shown in FIGS. 6A through 6C, the aesthetics of the apparatus can be preserved.

In the present example, since the caps 242 and 244 are made of a friction material (rubber material) and they serve as slip stoppers, the display apparatus is made more stable in the first supported state.

Figure 2A:
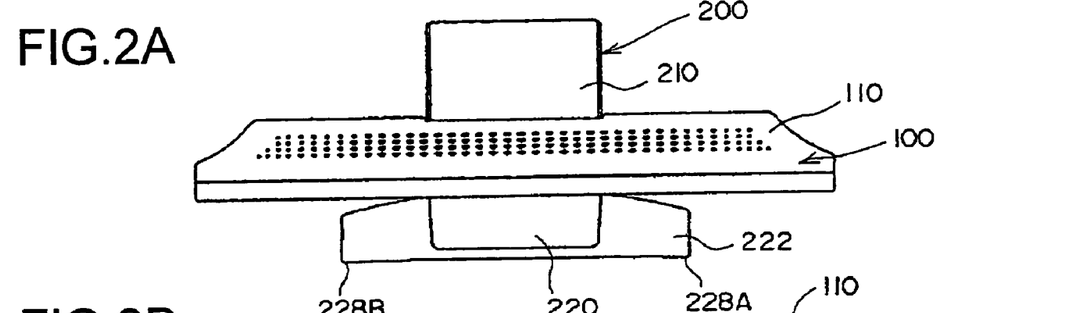
FIG. 2A and FIG. 2B and FIG. 2C are a top view, a front view and a bottom view, respectively, showing the external appearance of a display apparatus.
Figure 2B:
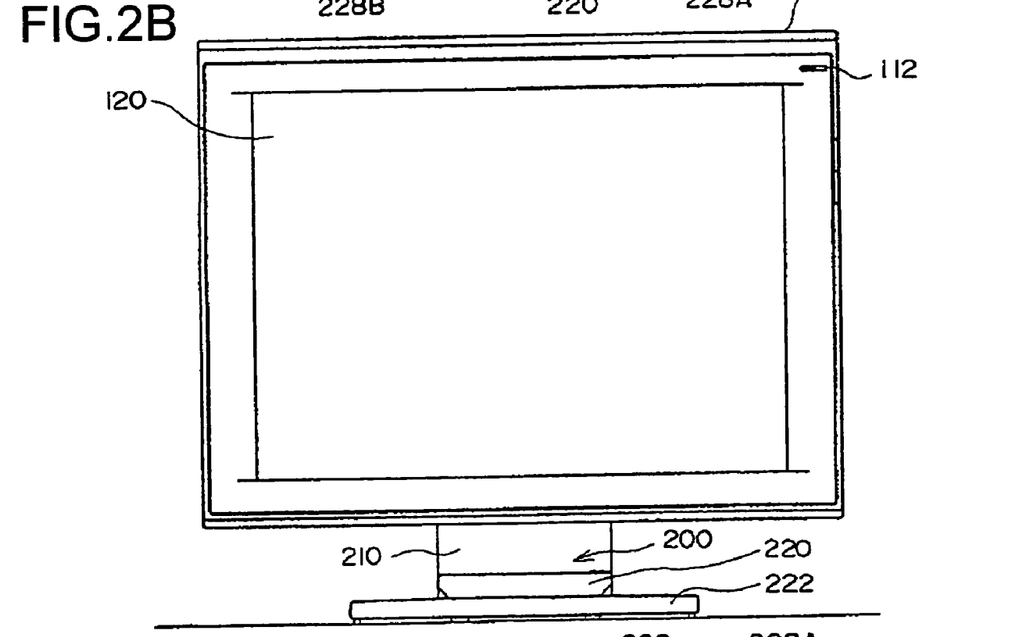
Figure 2C:
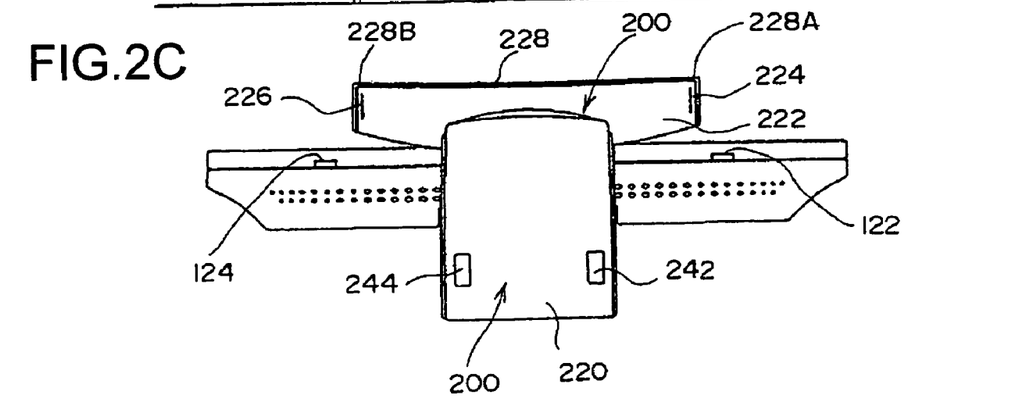

As shown in FIGS. 2A and 2C, the front edge section 228 of the flange section 222 of the second arm section 220 is given the shape of an arc having a large curvature where the flange section 222 projects forward gradually and slightly towards both ends. In the second supported state, side sections 228A and 228B that project forward furthest serve as contact sections that contact the surface on which the display apparatus is placed, and by adopting such a shape, the apparatus takes on an appearance that feels natural to the user.

In other words, in the second supported state, the display section 100 and the second arm section 220 stand on the surface on which the display apparatus is placed through point contact at the four points including the above-mentioned pair of protruding pieces 122 and 124 of the display section 100 and the pair of side sections 228A and 228B of the flange section 222 of the second arm section 220, and the display section 100 is supported in a state where it is in contact with that surface.

By thus achieving the second supported state through point contact, not only is the bottom end of the display section 100 prevented from becoming dirty, but the front end section 228 of the flange section 222 is prevented from becoming dirty, and therefore, even though the front edge section 228 of the flange section 222 becomes visible to the user in the first supported state illustrated in FIGS. 5A and 5B, the aesthetics of the display apparatus can be preserved.

In addition, in the present example, since the protruding pieces 122 and 124 of the display section 100 are made of a friction material (rubber material) and serve as slip stoppers, the display apparatus is made more stable in the second supported state.

Next, how a display apparatus having such a configuration is used will be described.

Figure 3A:
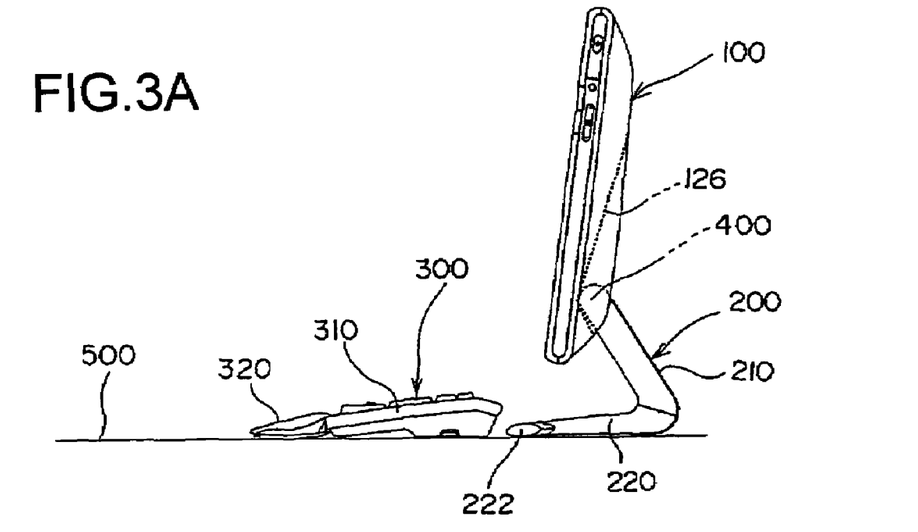
FIGS. 3A through 3C are side views showing a display apparatus in use.

FIG. 3A shows an example where the display apparatus of the present example is used in the first supported state.

In this state, the second arm section 220 of the stand section 200 extends to the front and the back underneath the display section 100, and the front edge section 228 of the second arm section 220 is positioned to the front of the display section 100, and the back side of the second arm section 220 is laid on a surface 500 of, for example, a desk or the like.

In addition, the keyboard apparatus 300 is placed to the front of the display apparatus, and the user operates the keyboard apparatus 300. In the present example, the keyboard apparatus 300 has such a structure where an arm rest 320 is placed at the front edge section of a main body section 310 when operating the key board apparatus 300. This arm rest 320 can be folded in half, and by extending the arm rest 320 and folding it back towards the main body section 310 as shown in FIG. 3B, the arm rest 320 also serves as a cover that covers the upper side of the main body section 310.

Figure 3B:
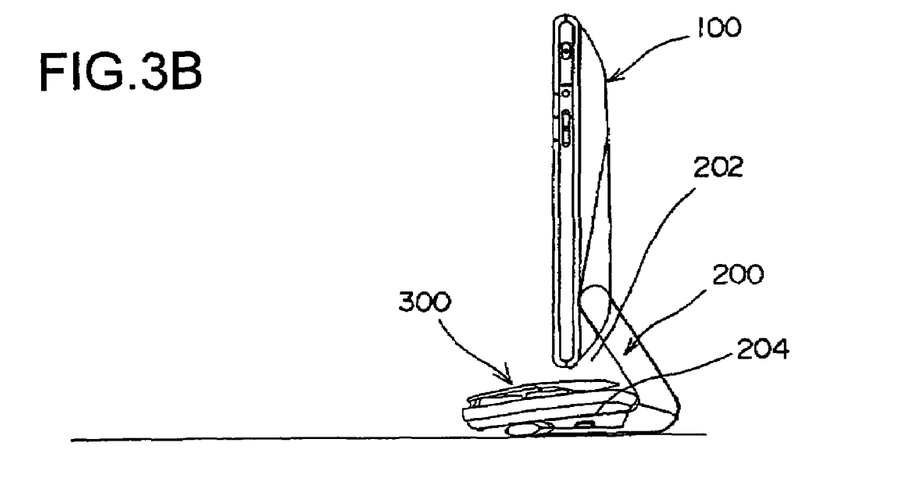

In addition, in the first supported state, when the key board apparatus 300 is not in use, as shown in FIG. 3B, the keyboard apparatus 300 may be stored in a keyboard housing section 202 formed in the space between the first arm section 210 and the second arm section 220 of the stand section 200, thereby securing more space on the desk, for example, and thus making it easier to do other work.

In so doing, the upper surface of the second arm section 220 (the side that faces the first arm section 210) serves as a mounting section 204 for holding the keyboard apparatus 300 in a stable manner. In addition, in order to make the keyboard apparatus 300 even more stable while stored in this state, instead of a structure where the keyboard apparatus 300 is simply mounted as described above, there may be provided on the mounting section 204 of the second arm section 220 a tab (or tabs), for example, that engages with the main body section 310 of the keyboard apparatus 300, or there may be provided friction material.

Figure 3C:
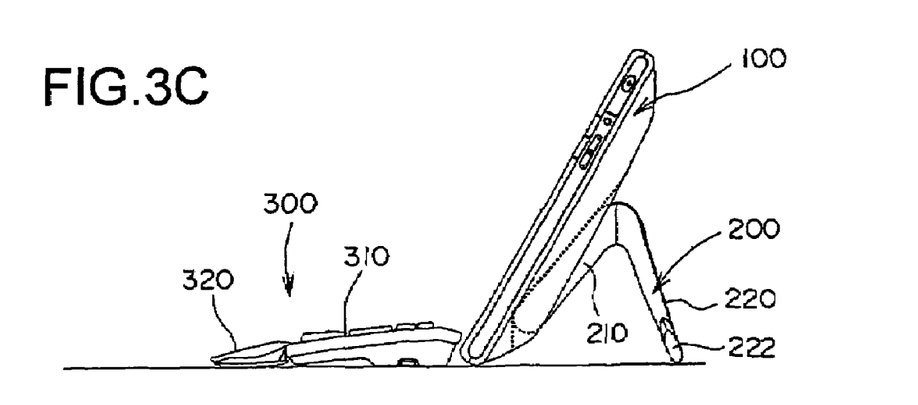

FIG. 3C shows the display apparatus of the present example as used in the second supported state.

In this state, by rotating the stand section 200 to the back of the display section 100, the first arm section 210 is accommodated in the housing recess section 126 of the case 110 so as to be positioned along the back side of the display section 100. The second arm section 220 extends downward diagonally from the back side of the display section 100. The flange section 222 as the tip section of the second arm section 220 and the lower end section of the display section 100 stand on the surface 500, and the display section 100 is thus supported in a state where it is in contact with the surface 500.

Figure 4A:
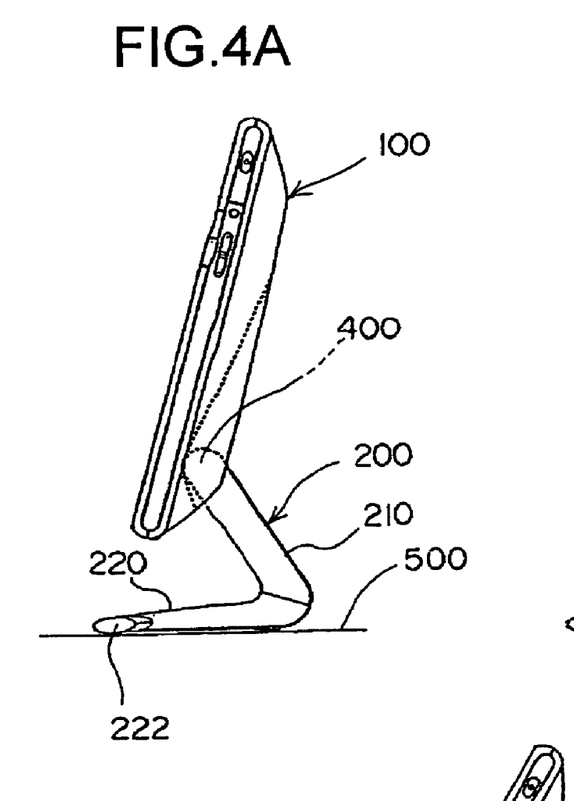
FIGS. 4A through 4C are side views showing a display apparatus in use.
Figure 4B:
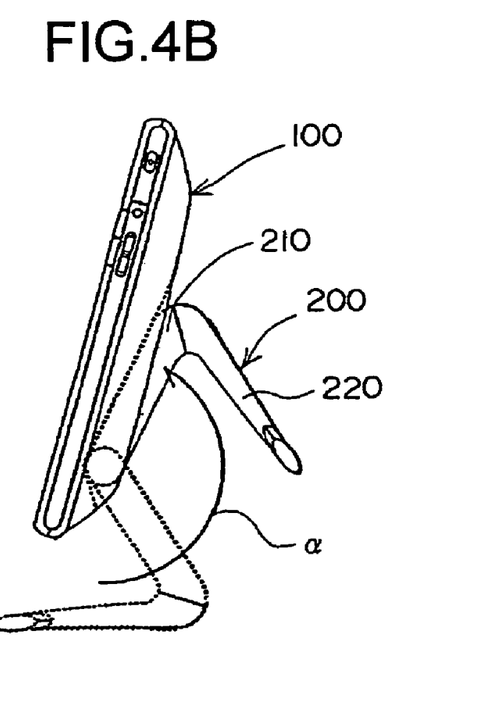
Figure 4C:
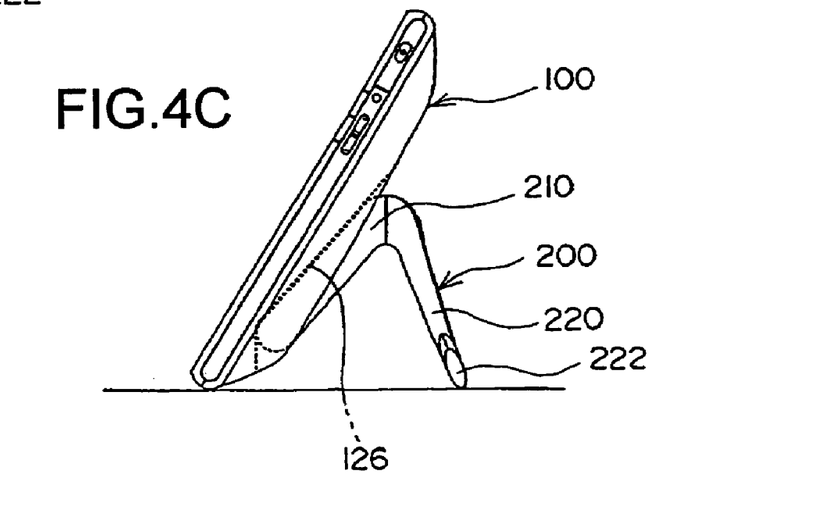

FIGS. 4A through 4C illustrate how the display apparatus is changed from the first supported state to the second supported state.

By having the stand section 200 of the display apparatus in the first supported state, as shown in FIG. 4A, rotated in the direction indicated by arrow α as shown in FIG. 4B, the second supported state, as shown in FIG. 4C, is achieved.

Further, as shown in FIGS. 5A and 5B, in the first supported state, by adjusting the angle of the display section 100 in relation to the stand section 200, fine adjustments of the angle of the display screen 120 can be made.

Further, as shown in FIGS. 6A through 6C, in the second supported state, too, by adjusting the angle of the display section 100 in relation to the stand section 200, fine adjustments of the angle of the display screen 120 can be made.

Since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

INDUSTRIAL APPLICABILITY

As described above, according to the present invention, a low-cost display apparatus that is capable of achieving, with a simple structure in which a hinge section is provided only between a display section and a stand section of the display apparatus, a first supported state, where the display section is supported at a distance from the surface on which the display apparatus is placed, and a second state, where the display section is lowered onto the surface.

The invention claimed is:

1. A display apparatus, comprising:
a display section formed in the shape of a thin flat panel; and
a stand section for supporting said display section on a surface,
wherein said stand section includes a first arm section and a second arm section that are fixedly connected at their ends so as to form a V shape,
a tip of said first arm section is attached to a back side of said display section through a hinge section so as to be rotatable in the forward and backward directions, and
said stand section is operable to achieving a first supported state in which, by having said first arm section extend downward diagonally from said hinge section, and said second arm section extend to the front and the back underneath said display section so that said second arm section is laid on said surface, said display section is supported at a distance from said surface, and a second supported state in which, by having said first arm section extend upward diagonally from said hinge section, and said second arm section extend downward diagonally from an end section of said first arm section so that a tip section of said second arm section and a lower end section of said display section stand on said surface, said display section is supported in a state where it is in contact with said surface.

2. The display apparatus according to claim 1, wherein said hinge section is provided at the lower end section of the back side of said display section.

3. The display apparatus according to claim 1, wherein said display section further comprises a recess section in which part of said first arm section is accommodated in said second supported state.

4. The display apparatus according to claim 1, wherein said first arm section and said second arm section are so provided as to be separable.

5. The display apparatus according to claim 1, wherein in said first supported state, the back side of said second arm section on the side opposite the side facing said first arm section is laid on said surface through point contact by contact sections at a plurality of positions.

6. The display apparatus according to claim 5, wherein at least one of said contact sections at a plurality of positions is made of a friction material.

7. The display apparatus according to claim 6, wherein said first arm section and said second arm section are connected separably through screws screwed into said first arm section from insertion holes formed in the back side of said second arm section on the side opposite the side tat faces said first arm section,
a cap is provided on each of the insertion holes formed on the back side of said second arm section, and
said caps are formed of a friction material having a large friction coefficient.

8. The display apparatus according to claim 1, wherein, in said second supported state, said tip section of said second arm section and said lower end section of said display section stand on said surface through point contact by contact sections at a plurality of positions.

9. The display apparatus according to claim 8, wherein at least one of said contact sections at a plurality of positions is made of a friction material.

10. The display apparatus according to claim 9, wherein a plurality of protrusion pieces formed of a friction material are provided on a lower edge section of said display section, and said protrusion pieces serve as said contact sections.

11. The display apparatus according to claim 1, wherein
a flange section extending in a direction that is substantially orthogonal to the direction in which said second arm section extends is provided on a tip of said second arm section,
a front edge of said flange section has an arc shape in which both ends project forward, and
in said second supported state, a plurality of points on said lower end section of said display section, and both side sections of said front edge of said flange section point contact said surface so as to stand on said surface.

12. The display apparatus according to claim 1, wherein a space formed between said first arm section and said second arm section serves as a keyboard housing section in which a keyboard apparatus can be housed and placed in said first supported state.

13. The display apparatus according to claim 1, said first arm section and said second arm section are of a flat plate shape.

14. The display apparatus according to claim 1, wherein said hinge section includes a friction mechanism for applying a frictional force in response to a rotational movement between said display section and said first arm section.

* * * * *